UNITED STATES PATENT OFFICE.

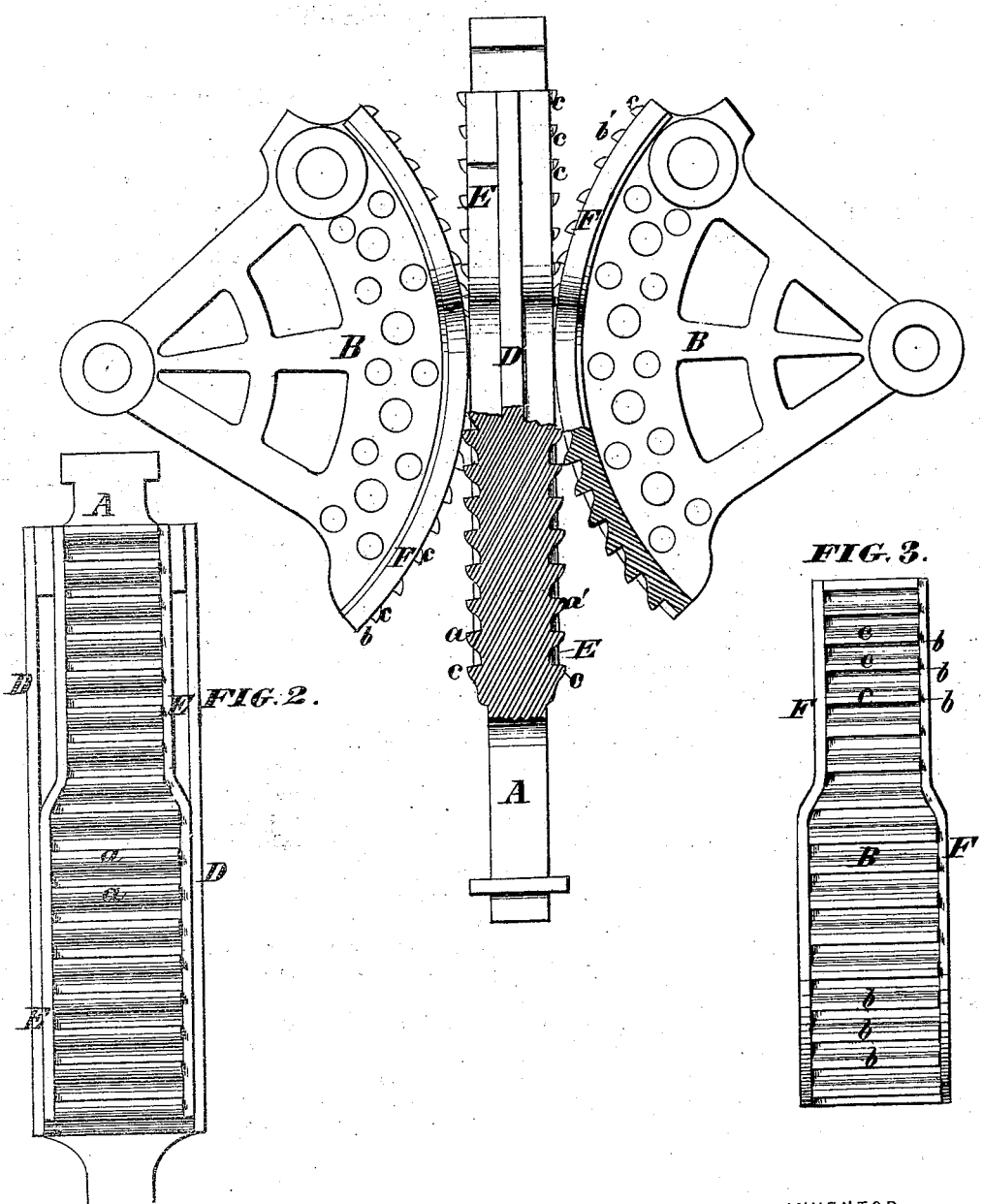

GEORGE W. GRADER, OF MARBLEHEAD, MASSACHUSETTS.

IMPROVEMENT IN COTTON-PRESSES.

Specification forming part of Letters Patent No. 153,068, dated July 14, 1874; application filed May 20, 1874.

*To all whom it may concern:*

Be it known that I, GEORGE W. GRADER, of Marblehead, in the county of Essex and the State of Massachusetts, have invented an Improvement in Racks and Sectors for Cotton and other Presses, of which the following is a specification:

This invention relates to an improvement in the press described in my Patent No. 119,346, granted to me on the 26th day of September, 1871. In operating machines of this general description, I have found difficulty in constructing the teeth of the racks and sectors of sufficient strength to sustain the great pressure to which they are subjected, the length of the teeth being necessarily limited. My present improvements consist, first, in constructing the teeth of racks and sectors in presses of this description with a re-enforce, by which I am enabled to add materially to the strength of the teeth without increasing their length or distance asunder. My improvement consists, second, in constructing the racks and sectors of greater width at their lower part, where they are required to sustain the force of the supplemental engine, as described in the patent before referred to.

In the accompanying drawings, Figure 1 is an elevation, partly in section, of a rack and pair of sectors, illustrating my invention. Fig. 2 is a face view of the rack. Fig. 3 is a face view of one of the sectors.

The teeth $a\ a'$ of the rack A, and the teeth $b\ b'$ of the sectors B, are each formed with convex projections $c$ at the back, imparting to the bases of the teeth greatly increased strength without necessitating the placing of them at a greater distance apart, as it will appear that the shorter or thinner points of the teeth of the rack engage within the contracted cavities between the bases of the sector-teeth, and vice versa.

It will further appear from Figs. 2 and 3 of the drawings that the lower parts of the rack and sectors are made of increased width, thus adding to the length, and consequently to the strength, of those teeth which are required to bear the increased strain of the engine in a press constructed in the manner described in my original patent before referred to.

D represent guiding-tongues projecting from the sides of the rack A, and working in suitable grooves or guideways in the press-frame. E F represent shroudings, which extend on the edges of the rack and of the sectors to the pitch-line of the teeth in each case, so that the shroudings F of the sectors roll on the straight shroudings E of the rack in operation.

The following is claimed as new:

1. The combination of the rack A and sectors B B, constructed with teeth $a\ a'\ b\ b'$, re-enforced by convex projections $c\ c$, and with shroudings E F, substantially as herein set forth.

2. The rack A, constructed wide below and narrower above, in combination with similarly-constructed sectors B B and shroudings E F, as herein shown and described.

In testimony of which invention I hereunto set my hand this 9th day of May, 1874.

GEO. W. GRADER.

Witnesses:
 OCTAVIUS KNIGHT,
 WALTER ALLEN.